United States Patent [19]
Syria

[11] 3,841,712
[45] Oct. 15, 1974

[54] ANALYZER FOR CONTROL SYSTEM WHICH REGULATES VEHICLE BRAKING

[75] Inventor: Ronald L. Syria, Utica, Mich.

[73] Assignee: Borg-Warner Corporation, Chicago, Ill.

[22] Filed: Aug. 1, 1972

[21] Appl. No.: 276,981

[52] U.S. Cl. ... 303/21 AF, 324/62 R, 324/158 MG, 340/52 B, 340/248 B, 340/248 C,
[51] Int. Cl. .............................................. B60t 8/12
[58] Field of Search......... 303/21; 324/34 R, 62 R, 57 R, 133, 158 MG; 340/52 R, 52 B, 248 A, 248 B, 248 C

[56] References Cited
UNITED STATES PATENTS

| | | | |
|---|---|---|---|
| 3,254,299 | 5/1966 | Butler, Jr. | 324/62 R |
| 3,275,384 | 9/1966 | Hirzel | 303/21 CG |
| 3,300,659 | 1/1967 | Watters | 340/248 C X |
| 3,457,560 | 7/1969 | McKinley | 340/248 C |
| 3,578,819 | 5/1971 | Atkins | 303/21 AF UX |
| 3,620,577 | 11/1971 | Neisch et al. | 303/21 EB |
| 3,628,099 | 12/1971 | Atkins et al. | 324/62 R X |
| 3,629,695 | 12/1971 | Taylor et al. | 324/57 R |
| 3,680,923 | 8/1972 | Peterson et al. | 303/21 AF |
| 3,706,971 | 12/1972 | Okamoto et al. | 340/52 B |
| 3,709,567 | 1/1973 | Van Ostrom et al. | 303/21 AF X |

Primary Examiner—Trygve M. Blix
Assistant Examiner—Stephen G. Kunin
Attorney, Agent, or Firm—James J. Jennings, Jr.

[57] ABSTRACT

A regulated braking arrangement includes left and right sensors to provide wheel velocity signals, and a solenoid for dumping brake line pressure to prevent wheel lock-up. This arrangement is governed by a control system. An analyzer for checking the control system includes a sensor resistance test circuit for determining whether the left and right sensor resistances are between acceptable upper and lower limit values. A composite circuit tests the solenoid, both for acceptable resistance and for effective operation under low voltage. A wheel velocity signal circuit provides an artificial wheel velocity signal for passage through a wheel select gate circuit to the sensors in the control system. A deceleration function generator operates, through the wheel select gate circuit, to simulate a rapid deceleration to test the operability of the control system. A mechanical logic switch passes signals from a wheel select switching circuit to the wheel select gate circuit; this switch facilitates testing of different control systems, whether select-high, select-low, or wheel-by-wheel systems.

13 Claims, 6 Drawing Figures

ANALYZER FOR CONTROL SYSTEM WHICH REGULATES VEHICLE BRAKING

BACKGROUND OF THE INVENTION

Regulated braking systems have been incorporated in railroad equipment, aircraft, and in automotive vehicles. Frequently such arrangements provide for automatic "pumping" of the brakes, or cycling of the pressure in the brake lines, to apply and then relieve the pressure for each of the vehicle brakes. This is conveniently done by positioning a sensor adjacent each wheel or axle assembly — or only a single assembly, in some installations — to provide signals connoting the wheel velocities. A control system, energized over a suitable power line when the braking command is issued, supplies an actuating signal to the solenoid or other pressure relief unit when an incipient wheel lock-up condition is sensed. Because of the vital importance of such regulated braking arrangements, it is important to provide diagnostic or analyzing equipment for simply and rapidly determining the operability of the control system.

It is therefore a primary consideration of this invention to provide such a system which accurately determines the operability of each wheel velocity sensor. Another important consideration of this invention is the provision of an analyzer which determines not only the operability of the solenoid, but whether it will cycle under low voltage conditions.

Yet another significant consideration is the provision of such an analyzer which is suitable with different types of logic in the control system, such as "select-low" logic system, "select-high," or a "wheel-by-wheel" logic system.

Another important consideration of the invention is to provide such an analyzer which not only determines operability of the control system components, but also determines whether sufficient power is being supplied to the control system.

SUMMARY OF THE INVENTION

The analyzer of this invention is useful with a regulated braking arrangement which has a control system of the type including a power line, at least one sensor input connection for receiving a signal related to wheel velocity, and a pressure relief output connection for coupling to the solenoid winding, to pass to the solenoid a signal for reducing the braking pressure and preventing wheel lock-up.

An important feature of this invention is a sensor resistance test circuit, which has an input connection suitable for coupling to the sensor input connection in the control system. To test the sensor, a reference resistor is connected to complete a voltage divider with the sensor. An indicator circuit is provided, including a first transistor series-coupled with an indicator component, such as a light-emitting diode. A second transistor is connected to turn on the first transistor when the effective resistance of the sensor under test is below the predetermined upper limit value, and a third transistor is connected to turn off the first transistor when the effective resistance of the sensor is below a predetermined lower limit value. Another sensor resistance test circuit can be provided for control systems which include a second sensor.

In accordance with another aspect of the invention, a solenoid resistance test circuit is provided to determine whether the solenoid resistance value is between predetermined upper limit and lower limit values. In addition a low voltage test circuit is connected to provide an indication of solenoid operability under low voltage conditions.

Another important component of the invention is a deceleration function generator, which provides a simulated deceleration signal. This signal is applied, over the input connection of the sensor resistance test circuit, to the logic circuits in the control system under test. Indicator means, which can be coupled to the pressure relief signal output connection of the control system, provides an indication that the logic in the control system is producing a pressure relief signal when the simulated deceleration signal is received.

In addition the analyzer of this invention can include a wheel velocity signal generator for providing a signal analogous to the wheel velocity signal from a sensor coupled to the control system. A wheel select gate circuit receives both the wheel velocity signal and the simulated deceleration signal, and passes these signals to the sensor input connections of the control system under test. The analyzer may also include a wheel select switching circuit and a logic switch, to facilitate checking different control systems employing select-low logic, select-high logic, and wheel-by-wheel logic.

Another aspect of the invention is the incorporation of a power test circuit, coupled to the power line which supplies the analyzer, to provide an indication when the level of the voltage on the power line exceeds a preset value.

THE DRAWINGS

In the several figures of the drawings, like reference numerals identify like components, and in the drawings.

GENERAL SYSTEM DESCRIPTION

The analyzer of the present invention is useful to test a braking control system installed on a multi-wheel vehicle, such as a passenger car or a large truck of the tractor-trailer type which employs a braking system including a fluid under pressure, whether the fluid is a gas such as air, or a hydraulic fluid. A preferred embodiment of the invention will be described in conjunction with the control system and portions of a truck braking system.

Figure 1:
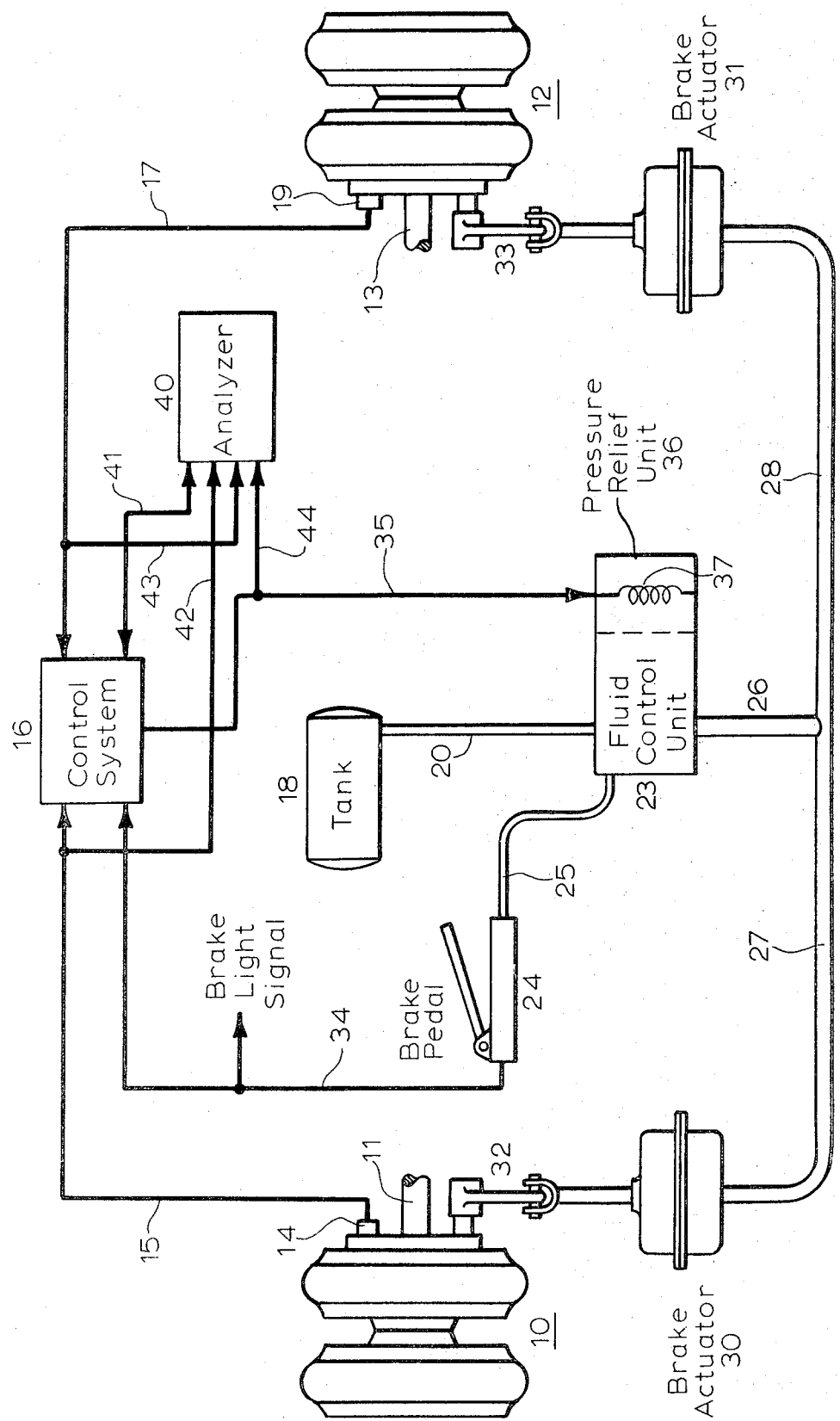
FIG. 1 is a system diagram depicting vehicle components, a control system for regulating the braking of the vehicle, and the analyzer of this invention.

FIG. 1 shows a first wheel assembly 10 mounted on a first axle 11 of the truck, and a second wheel assembly 12 mounted on a second axle 13. A first sensor 14 is positioned adjacent wheel assembly 10 to provide a first wheel velocity-indicating signal on line 15 for application to control system 16. A second sensor 19 is disposed adjacent second wheel assembly 12 to provide another wheel speed-indicating signal on line 17 which is also supplied to the control system. Sensors 14, 19 can be of the conventional magnetic type in which a winding is provided and disturbance of a magnetic field is sensed to provide an electrical signal to the control system. Other sensor types such as proximity sensors, tachometer installations, or other units can be employed so long as the output indications are, or can be converted to, electrical signals which vary as a function of the respective wheel speeds.

The braking system includes a tank 18 for retaining a fluid such as air under pressure. Air passes through conduit 20 to fluid control unit 23. When brake pedal assembly 24 is actuated to pass a signal over conduit 25 to the fluid control unit, then unit 23 passes the pressurized fluid to conduit 26 and through conduits 27, 28 to the brake actuators 30, 31. Brake actuator 30 operates in a well known manner over brake linkage 32 to apply the brakes to the wheel assembly 10. Brake linkage 33 likewise is coupled between the brake actuator 31 and the brakes on the second wheel assembly 12.

At the same time a fluid signal is provided by the brake pedal assembly, an electrical control signal is also provided and passed over power line 34 to an input connection of control system 16. This signal can be taken from the circuit which normally energizes the brake lights on the tractor and/or trailer of the truck units. Control system 16 is effective, when an excessive deceleration of either wheel assembly is sensed, to provide an output signal from its pressure relief signal output connection over line 35 to pressure relief unit 36 which is associated with fluid control unit 23. The pressure relief unit can be a solenoid-valve combination such that upon receipt of the electrical output signal over line 35, the solenoid winding 37 is energized and the valve portion is displaced to relieve the pressure normally passed to the brake actuators and thus prevent lock-up of the wheel assemblies.

Particularly in accordance with the present invention, an analyzer system 40 is provided to indicate satisfactory operation of control system 16, and further to signify that the left and right sensors 14, 19 and the solenoid winding 37 are in good condition. The analyzer 40 receives d-c energy over power line 41, which energy can be passed through control system 16 whenever brake pedal 24 is actuated to provide a signal on power line 34. Input lines 42 and 43 are respectively coupled, over conductors 15 and 17, to the left and right sensors 14, 19 and to the sensor input connections of control system 16. The other input line 44 of the analyzer is coupled over conductor 35 to the pressure relief signal output connection of control system 16 and to solenoid winding 37. Although the separate conductors are shown connected externally of control system 16, in practice it is a simple matter to provide a first receptacle on the housing of control system 16 for mating engagement with another receptacle attached, either directly or through a cable, to analyzer 40, to provide the requisite electrical connections for effective diagnostic check of the logic circuits within control system 16 in addition to the sensors and solenoid winding external to the control system. The analyzer is particularly useful in a control system of the type disclosed and claimed in the application of Ronald L. Syria, entitled "CONTROL SYSTEM FOR REGULATED BRAKING ARRANGEMENT," filed June 2, 1972, Ser. No. 259,126, and assigned to the assignee of this invention. Those skilled in the art will appreciate the interchangability of the analyzer of this invention to test not only a control system of the type described in the copending application, but also other control arrangements having a power input line, at least one sensor, and a solenoid.

Figure 2:
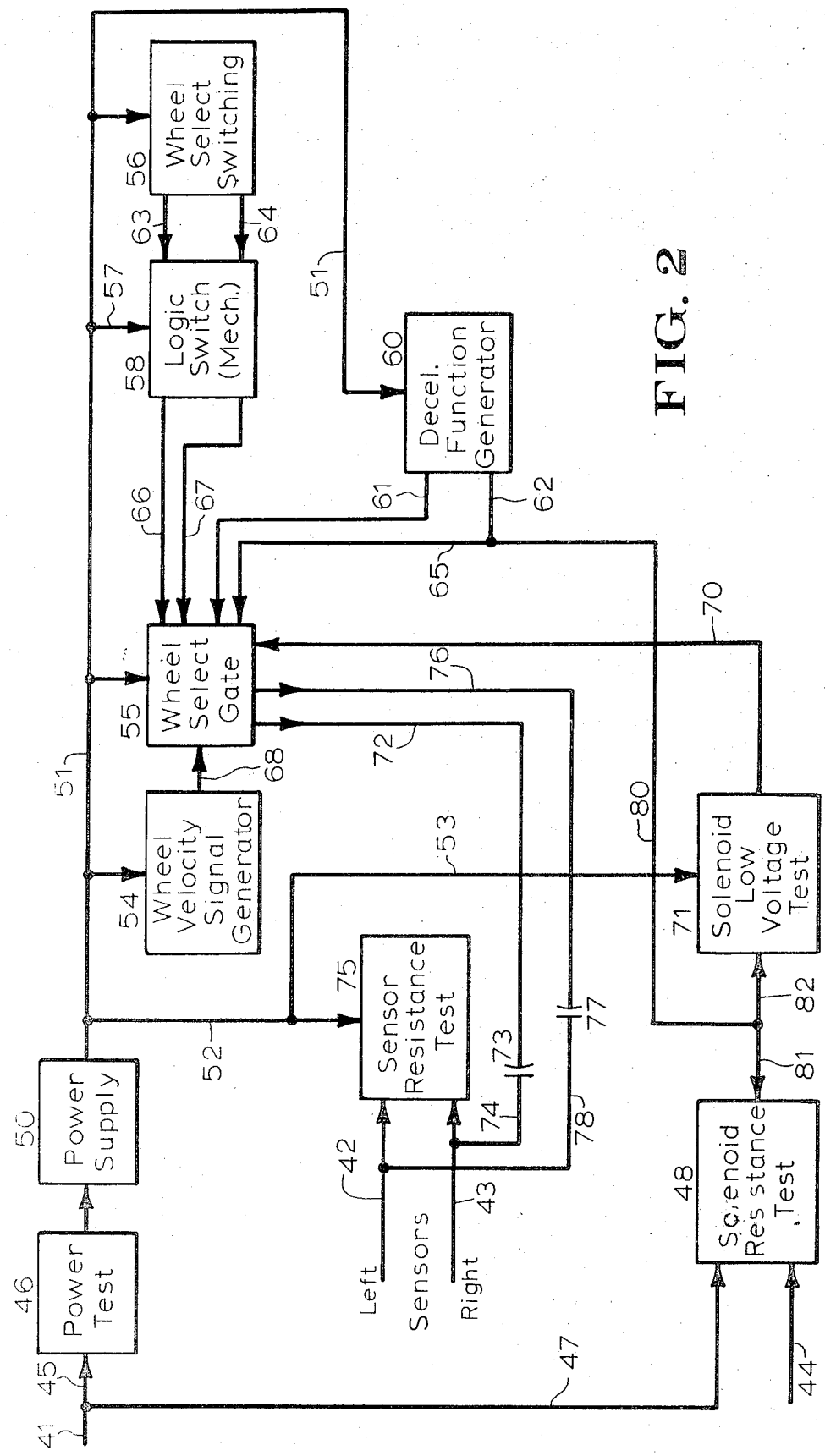
FIG. 2 is a block diagram depicting various stages of an analyzer constructed in accordance with this invention.

In the block arrangement of FIG. 2, the d-c input power received over line 41 is passed over line 45 to power test stage 46, and over another line 47 to an input connection of solenoid resistance test circuit 48. Power test stage 46 provides a signal when the level of the voltage applied is suitable to effect operation of components normally found within a control system, such as system 16 in FIG. 1. The d-c power is then passed over power supply stage 50, which may include a simple regulator stage, for distribution over lines 51, 52 and 53 to energize the various other stages as shown.

In the upper portion of FIG. 2, power from line 51 energizes a wheel velocity signal generator circuit 54, a wheel select gate circuit 55 and a wheel select switching circuit 56; power from line 51 is also applied to one portion of a logic switch 57 in a manner to be explained hereinafter. The energy from line 51 is also applied to deceleration function generator stage 60, which can be a simple multivibrator or other switching circuit to apply over its output lines 61, 62, signals which are of different characteristics. For example, when stage 60 is a multivibrator, the signal on line 61 can be high when the signal on line 62 is low, and vice versa. Signals which vary other than as a square wave can be generated to provide a suitable deceleration signal for actuation of a logic arrangement in control system 16. Ramp-type signals such as a sawtooth wave, or a triangular waveshape, can be used so long as the slope of the actual signal generated and provided on lines 61, 62 exceeds the slope of the deceleration signal which will trigger the particular circuits within control system 16. In a similar manner wheel select switching circuit 56 can also be a multivibrator connected to provide opposite-going signals on its output conductors 63, 64 for application to logic switch 58. The actual signals applied over conductors 66, 67 to wheel select gate circuit 55 are a function of the setting of logic switch 58. This switch is important to the invention, in that it allows a single analyzer system 40 to work with different control systems of the select-high logic type, select-low logic type, and wheel-by-wheel logic system. In addition the wheel select gate circuit 55 receives the deceleration signals over lines 61, 65, the wheel velocity signal over line 68 from wheel velocity signal generator 54, and a disabling signal over line 70 from the solenoid low voltage test stage 71. This signal on line 70 is actually applied to three different points in the wheel select gate circuit 55, as will be explained hereinafter, to facilitate the low voltage operational test of the solenoid.

One output signal from wheel select gate circuit 55 is passed over conductor 72, capacitor 73, conductor 74 and input conductor 42 to the "left" or first sensor input connection of test stage 75. The other output signal from wheel select gate circuit 55 is passed over conductor 76, capacitor 77, and conductor 78 to the right or second sensor input connection of test circuit 75. Of course if a single sensor is utilized in the control system being analyzed, there is only a single output line from wheel select gate circuit 55 to the input connection of sensor resistance test circuit 75. As will be made apparent, the connections over lines 42, 43 allow test circuit 75 to determine whether the effective resistance values of each sensor winding fall within acceptable limits to indicate the sensor under test is good. In addition the output signals from the wheel select gate circuit 75, simulating a rapid deceleration of wheel velocity, are applied over lines 72, 76, capacitors 73, 77, conductors 74, 78, and over conductors 42, 43 to the logic circuits within control system 16 to determine whether the logic circuits themselves are operating effectively. If they are, each deceleration signal (whether through the left or right circuit) will produce a pressure relief signal (or "dump" signal) to relieve the pressure in the brake line, and this actuation of the solenoid valve will be audible. In addition test lights are provided in analyzer 40 to indicate which circuits are operating satisfactorily.

The solenoid test circuits 48, 71 are depicted separately. Solenoid resistance test circuit 48 operates to determine whether the resistance of the solenoid winding falls within a preset range of values, and test stage 71 determines whether the solenoid will operate suitably under low voltage conditions. The deceleration signal from function generator 60 is passed over conductors 62, 80 and then divided over conductors 81 and 82 for application to both solenoid resistance test circuit 48 and the solenoid low voltage test circuit 71. Having described this general arrangement of the basic components of the analyzer system, a more detailed circuit description will now be set out.

DETAILED DESCRIPTION OF THE INVENTION

Figure 3:
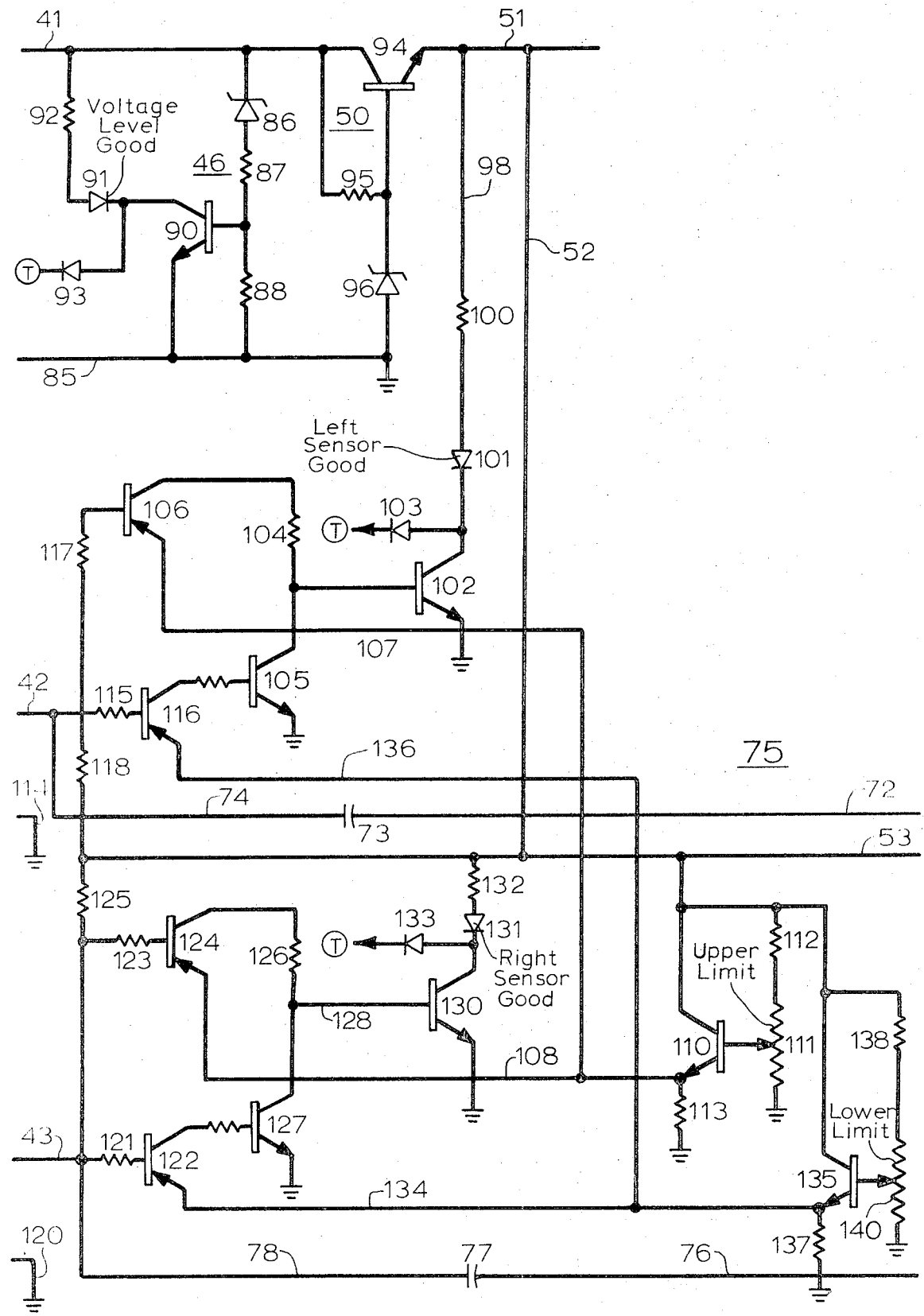
FIGS. 3–6 are schematic diagrams, which, taken together, supply circuit details for the analyzer stages represented more generally in FIG. 2.

FIG. 3 shows the circuit details of the power test circuit 46, power supply arrangement 50, and the sensor resistance test circuit 75. As there shown power line 41 and associated ground conductor 85 transfer the power received from control system 16 (FIG. 1) to power test circuit 46. In the test circuit a series circuit including Zener diode 86 and resistors 87 and 88, are connected between conductors 41 and 85. NPN type transistor 90 has its base coupled to the common connection between resistors 87, 88 and its emitter grounded. Its collector circuit is coupled through a light-emitting diode 91 and a resistor 92 to line 41, and its collector is also coupled through another diode 93 to a point reference T. The symbol T as used in the diagram represents one terminal of a grounding switch (not shown) which can be utilized to test the conductivity and illumination of each light-emitting diode in the system. That is, when power is supplied between conductors 41 and 85, if the cathode of diode 93 is grounded by grounding point T, current flows through resistor 92, light-emitting diode 91, and diode 93 to ground. This illuminates the diode 91 and shows that the indicator portion of the circuit is good. In the circuit shown, Zener diode 86 is selected so that when a voltage of approximately 9 volts is present between conductors 41 and 85, transistor 90 is gated on and conducts to complete a grounding circuit for light-emitting diode 91. This indicates to the person using analyzer 40 that there is sufficient power supplied from the automotive vehicle battery to the control system to energize not only the control circuit but also the solenoid including the winding 37. Thus the power test circuit 46 is a significant part of the inventive combination.

Power supply circuit 50 includes an NPN type transistor 94 connected as a series regulator. Its collector is coupled to conductor 41 and its emitter is coupled to conductor 51. A resistor 95 is coupled between the base and collector. Another Zener diode 96 is coupled between the base and ground to regulate the level of voltage on line 51. In the embodiment illustrated this voltage level was selected to be 5 volts. Accordingly this regulated voltage level is utilized to energize the other circuits in the analyzer.

The regulated voltage from line 51 is passed over lines 52 and 53 to the sensor resistance test circuit 75, which checks the resistance of both the left and right sensors. To provide a brief perspective of the sensor resistance test circuit "left sensor" or upper portion of this circuit includes a reference resistor 118 connected to complete a voltage divider with the sensor under test, the resistance of which sensor appears between conductors 42 and 114. An indicator circuit includes a first transistor 102 series-coupled with an indicator component, which in the illustrated embodiment is a light-emitting diode 101. A second transistor 106 is connected to turn on the first transistor 102 when the effective resistance of the left sensor is below the predetermined upper limit value, as established by potentiometer 111. A third transistor 116 is connected to torn off the first transistor 102 (through transistor 105) when the effective resistance of the left sensor is below the predetermined lower limit value, as set by potentiometer 140.

The energizing conductor 51 is coupled in a series circuit including conductor 98, resistor 100, light-emitting diode 101 and the collector-emitter circuit of NPN type transistor 102 to ground. The collector is also coupled through a diode 103 to another test point T, which upon grounding will illuminate the diode 101 to show this diode is in good condition. The base of transistor 102 is coupled to one side of a resistor 104, and is also coupled to the collector of another transistor of another NPN type transistor 105, the emitter of which is grounded. The other side of resistor 104 is coupled to the collector of PNP type transistor 106, the emitter of which is coupled over conductors 107, 108 and an emitter-follower NPN type transistor 110 to the movable arm of potentiometer 111. This potentiometer is coupled between ground and, over resistor 112, conductor 53, to which the regulated voltage is applied. Resistor 111 is the upper limit adjust unit for the resistance test circuit. That is, adjustment of its wiper arm position is effective to set the upper limit of the resistance range within which the effective value of the left and right sensor resistances must fall to be tested "good." This upper limit is set by the adjustment of the bias applied to the emitter of transistor 106. The emitter of stage 110 is coupled through resistor 113 to ground.

The left sensor to be tested is coupled between conductors 42 and 114, with conductor 114 grounded. Conductor 42 is coupled through a first resistor 115 to the base of PNP type transistor 116, through another resistor 117 to the base of transistor 106, and through reference resistor 118 to the conductor 53, which receives the regulated d-c voltage. It is thus apparent that reference resistor 118, together with the resistance of the sensor coupled between conductors 42 and 114 (plus the resistance of the circuit wiring) forms a voltage divider so that the voltage level on conductor 42 can be utilized in the resistance test circuit. For the present it is not necessary to consider the dynamic signal to be applied over capacitor 73 and, over conductor 42, to the logic circuits within the control system itself.

The right sensor is coupled between conductors 43 and 120, with conductor 120 grounded. Conductor 43 is coupled over a resistor 121 to the base of a PNP type transistor 122, is also coupled over another resistor 123 to the base of another PNP type transistor 124, and is also coupled over another reference resistor 125 to the energizing conductor 53. Accordingly another voltage divider arrangement is formed with reference resistor 125 and the effective resistance of the right sensor and its associated wiring as measured between conductors 43 and 120. The emitter of transistor 124 is coupled over line 108 to the emitter-follower stage 110, and the collector of transistor 124 is coupled over a resistor 126 both to the collector of an NPN type transistor 127 and, over line 128, to the base of another NPN type transistor 130, the emitter of which is grounded. The collector of transistor 130 is coupled through a light-emitting diode (LED) 131 and a resistor 132 to power line 53. The common connection between the collector of transistor 130 and the cathode of diode 131 is coupled through a test-circuit completing diode 133 to another switch point designated T. The emitter of transistor 122 is coupled over line 134 to the emitter of emitter-follower stage 135, and the emitter of stage 116 in the left sensor test circuit is also coupled over another line 136 to the same emitter-follower circuit. The emitter of transistor 135 is coupled through resistor 137 to ground, and its collector is coupled to voltage supply line 53. Between line 53 and ground is a series circuit including resistor 138 and a potentiometer 140, the wiper arm of which is coupled to the base of transistor 135. Potentiometer 140 is the lower limit adjust for both the sensor circuits and the resistance test circuit. Adjustment of its wiper arm setting establishes a lower limit resistance value which must be exceeded by the effective sensor resistance to test "good" by illuminating the appropriate LED. This wiper arm setting of pot 140 establishes the bias level at the emitter of both transistors 116 and 122.

To consider the operation of circuit 75, it is initially assumed that a sensor is coupled between conductors 42 and 114 in the left sensor test circuit. For those control systems in which only a single sensor is utilized, the circuitry below the left sensor test circuit can of course be eliminated, except for the upper limit and lower limit adjust circuits. Considering the upper limit test initially, a bias value related to the setting of potentiometer 111 is translated through the emitter-follower stage 110 and, over conductor 107, to the emitter of transistor 106. This establishes a reference level on the emitter of transistor 106, related to the upper limit of acceptability for the resistance test of the left sensor. As the left sensor is coupled in a resistance divider network including reference resistor 118, depending upon the actual resistance value of the left sensor and its associated wiring, a particular voltage is passed over conductor 42 and resistor 117 to the base of transistor 106. If the voltage level applied over resistor 117 is less than the bias level established on the emitter of transistor 106 — indicating the actual resistance value of the sensor is less than the upper limit of acceptable resistance — the base-emitter junction of transistor 106 is forward biased and this transistor is turned on. The voltage on the emitter of transistor 106 is thus transferred to its collector and, over resistor 104, utilized to drive on transistor 102. This completes an obvious energizing circuit for the "left sensor good" LED 101, which is illuminated to indicate that the left sensor circuit is in fact good (at least as respects the upper resistance limit). Of course if the resistance of the sensor had been too high, transistor 106 would not have been gated on and diode 101 would not have been illuminated.

Considering now the lower limit of acceptable resistance for the left sensor, the bias level for the lower limit is established by potentiometer 140 and passed through emitter-follower 135, over conductor 136 to the emitter of transistor 116. If the voltage from the voltage divider circuit which is applied over resistor 115 to the base of transistor 116 is not too low — that is, if it is above the bias level established at the emitter of transistor 116 — then transistor 116 will not turn on and transistor 105 will also remain off. Thus the previously-described circuit including transistors 106 and 102 is not disturbed, and LED 101 remains illuminated to indicated that the resistance value of the left sensor is within acceptable limits. Had the left sensor resistance value been too low, transistor 116 would be gated on and turn on transistor 105, in effect robbing the drive to the base of transistor 102. This turns off transistor 102 and interrupts the energizing circuit for the "left sensor good" diode 101. The circuit for the right sensor test, including transistors 122, 124, 127 and 130, operates in essentially the same way to illuminate the "right sensor good" diode 131 when the effective resistance value of the right sensor is within limits predetermined by the settings of potentiometers 111 and 140.

Figure 4:
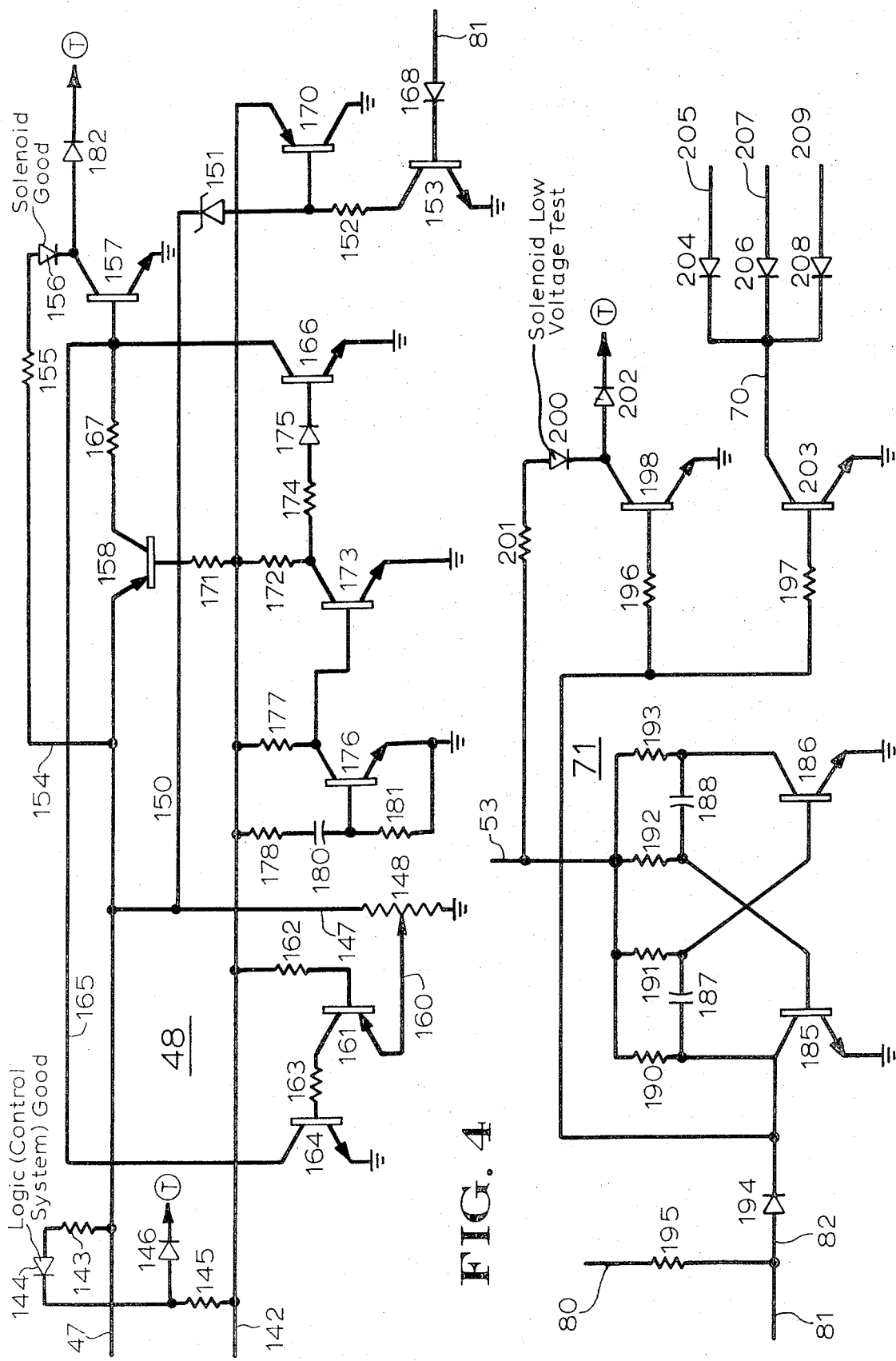

FIG. 4 sets out the details of the solenoid resistance test circuit 48 (upper portion) and the solenoid low voltage test circuit 71 (lower portion). Considering first the test circuit 48 which examines the solenoid winding for acceptable resistance, line 47 is coupled to line 41 to receive input d-c energy as already described. The other input line 142 to the solenoid resistance test circuit is coupled to that end of the solenoid winding which is grounded when the pressure relief system is energized. For example, the connection could be made to the conductor 35 in FIG. 3 of the copending application identified above, which conductor is virtually grounded as the driver transistor 100 in FIG. 3 of that application is gated on to energize the solenoid and dump the brake line pressure. Coupled in series between conductors 47 and 142 (FIG. 4, this application) is a series circuit including a resistor 143, a light-emitting diode 144 and another resistor 145. When the logic circuits in control system 16 are operating satisfactorily, the "dump" signal will be provided to actuate the solenoid, and the voltage level on line 142 will periodically go low (to ground) as the solenoid winding is grounded. This will flash LED 144 to indicate that the logic in the control system is operating satisfactorily. A circuit-completing diode 146 is coupled between the grounding switch point designated T and the common connection between resistor 145 and diode 144, to provide an indication that the logic light 144 is good. This "logic good" condition signalled by LED 144 does not guarantee that the solenoid resistance is within acceptable limits, or that the solenoid unit will operate satisfactorily under low voltage conditions. Tests for these two additional conditions are completed by circuits 48 and 71.

The voltage level on conductor 47 is extended over conductor 147 to the top of a potentiometer 148, the other end of which is grounded; is also extended over a conductor 150 to the cathode of a Zener diode 151, the anode of which is coupled through a resistor 152 and the collector-emitter path of an NPN type transistor 153 to ground; is also coupled over conductor 154 and the series circuit including resistor 155, another light-emitting diode 156 and an NPN type transistor 157 to ground; and is also coupled to the emitter of PNP type transistor 158. The movable arm of potentiometer 148 is coupled over conductor 160 to the emitter of a PNP type transistor 161, the base of which is coupled through a resistor 162 to conductor 142. The collector of transistor 161 is coupled through a resistor 163 to the base of NPN type transistor 164, the emitter of which is grounded. The collector of this transistor is coupled over conductor 165 to the base of transistor 157, to the collector of transistor 166, and to one end of resistor 167, the other end of which is coupled to the collector of transistor 158. Conductor 81, over which signals are received from the deceleration function generator 60, is coupled through a diode 168 to the base of transistor 153. A PNP type transistor 170 is connected as a series regulator with its collector grounded, its emitter coupled to the input conductor 142 and its base coupled to the common connection between resistor 152 and the anode of Zener diode 151.

Between the base of transistor 158 and ground is a series circuit including resistors 171, 172 and the collector-emitter circuit of NPN type transistor 173, the emitter of which is grounded. Its collector is coupled through a series circuit including resistor 174 and a diode 175 to the base of transistor 166. The base of transistor 173 is coupled to the collector of NPN type transistor 176 and is also coupled, through resistor 177, to conductor 142. The emitter of transistor 176 is grounded. A series circuit coupled between conductor 142 and ground includes resistor 178, capacitor 180, and another resistor 181. The base of transistor 176 is coupled to the common connection between capacitor 180 and resistor 181.

In general, transistor 157 at the upper right portion of solenoid resistance test circuit 48 will be switched on to illuminate LED 156 when the resistance of the solenoid winding is within an acceptable range. The LED 156 can be tested like the other light-emitting diodes, by grounding the terminal designated T connected to the cathode of diode 182, to complete a path for current flow through LED 156 and check its condition.

Assuming initially that the test for the low resistance end of the solenoid winding will first be made, if this solenoid resistance is too low, then transistor 157 will not be turned on. Between the base of transistor 158 and ground is a series circuit including a first resistor 171, a second resistor 172 and the collector-emitter path of transistor 173. It is further assumed that transistor 173 is conducting, so that the lower end of resistor 172 is grounded. In a preferred embodiment to suit particular solenoid characteristics, resistor 172 was 50 ohms. Resistor 172 forms a voltage divider with the effective resistance of the solenoid and the wiring connections coupled to the conductors 47, 142, and the solenoid winding is the top portion of this voltage divider. If the solenoid resistance is sufficiently high — that is, not shorted or below the acceptable lower limit — the voltage appearing between conductors 47, 142 is sufficient to forward bias the base-emitter junction of transistor 158. This base-emitter junction, with resistor 171, is in effect coupled across the solenoid winding. As transistor 158 turns on, the voltage appearing at its emitter will be transferred to the collector and, over resistor 167, will be effective to turn on transistor 157. Accordingly LED 156 is illuminated when the solenoid winding resistance is not too low, assuming for the moment that the solenoid resistance will not exceed the high level.

Considering now potentiometer 148, it is emphasized that the upper portion of this potentiometer is coupled to line 47. Thus any irregularity or fluctuation of the voltage from the basic vehicle supply will likewise change the voltage across potentiometer 148, with a proportiante change of the voltage level established on conductor 160. This establishes a reference positive bias level at the emitter of transistor 161. The base of this transistor is coupled over resistor 162 and conductor 142 to the other side of the solenoid winding. Noting that the solenoid winding and resistor 172 are connected in a voltage divider arrangement, the base of transistor 161 is thus coupled over resistor 162 to the voltage division point or the common junction between the solenoid winding and resistor 172 in the voltage divider. It is helpful to consider the potential on line 47 is a zero reference voltage, and the potential on line 142 is some voltage negative with respect to that on line 47. Further it is assumed that the solenoid winding is open. With the solenoid winding open, the voltage on line 142 is at minus the supply voltage, for example minus 12 volts, with respect to the potential on line 47. Under these conditions, with the positive bias reference voltage on the emitter of transistor 161, this transistor is turned on and transfers bias (positive potential) over its collector circuit and resistor 163 to the base of transistor 164, and transistor 164 conducts. In effect conduction of transistor 164 grounds the base of transistor 157, robbing this transistor of its drive. This interrupts the circuit for light-emitting diode 156, which is extinguished. Accordingly even if the effective resistance of solenoid winding 37 were above the acceptable lower limit value, if it exceeds the preset higher level value (determined by the setting of potentiometer 148), then LED 156 will be extinguished. The LED 156 will also be extinguished if the resistance value is too low, in that transistors 158 and 157 would not be driven on initially.

The foregoing explanation describes the resistance measurement of the solenoid when the logic in control system 16 is not being cycled. Considering now that the deceleration function generator 60 (FIG. 2) is passing simulated deceleration signals through the wheel select gate circuit 55 and over conductors 42, 43 to the logic input connections in control system 16 (FIG. 1), the control system will operate to energize and de-energize the solenoid continually, so that the potential on line 142 in FIG. 4 will be sequentially grounded and ungrounded. This occurs as the solenoid valve is energized and de-energized. A valuable part of the testing procedure of this analyzer is the audible response as the solenoid valve opens and closes, giving an excellent indication that the system is in fact cycling and that the valve is operating. However with the low-ohms resistor 172 continually connected to ground as transistor 173 is conducting, this maintains a small current flow through the solenoid which, while not adequate to actuate the solenoid, is nevertheless effective after the solenoid has been actuated to maintain a sufficient holding current so that the solenoid will not drop out when it normally should. Thus the solenoid would be energized the first time and then remain in the energized condition without cycling on and off, even though the control system logic is being cycled to provide energize and de-energize signals. It is therefore requisite that the low-ohm resistor 172 be ungrounded at the appropriate times to interrupt the holding current path and allow the solenoid to be de-energized. To this end the components 176-181 are connected as a switch and timer arrangement. Transistor 176 can be considered a switch, and the timing is effected by the combination of resistor 178 and capacitor 180.

Assuming now the solenoid has been energized and the potential on line 142 in effect driven to ground, the drive for transistor 173 has been removed, as this drive is normally received over line 142 and resistor 177. Likewise the charging current for the series circuit including resistor 178 and capacitor 180, which provides the requisite turn-on potential for transistor 176, is not flowing while the voltage on conductor 142 remains at ground. Accordingly after the solenoid is energized, there is drive to neither transistor 173 nor transistor 176. Assuming now it is desired to de-activate the solenoid by de-energizing its winding, it takes a certain finite time for the solenoid unit to respond and return to the de-energized or unactuated position. If this time interval is of the order of 100 milliseconds, then it is of course desirable to delay the grounding of resistor 172 for at least this time interval. This will allow the solenoid to become de-energized and the circuit to stabilize. As soon as conductor 142 is ungrounded, there is an immediate flow of charging current through resistor 178, capacitor 180 and the base-emitter junction of transistor 176. So long as this charge current is flowing, transistor 176 is gated on and in its turn grounds the base of transistor 173, insuring that transistor 173 remains off during the charging time. In effect this circuit "lifts" the end of the resistor 172, which would otherwise be grounded over transistor 173, off ground for the period of time required by the charging of capacitor 180. Once this RC circuit 178, 180 has charged, the drive to the base-emitter junction of transistor 176 is removed, and it is turned off. As transistor 176 turns off, it removes the ground from the base of transistor 173, which again receives its base drive over resistor 177 and thus turns on. At this time the low ohm resistor 172 is again effectively grounded through transistor 173.

During the time that the resistor 172 is ungrounded by opening or nonconduction of transistor 173, it is desirable to insure that LED 156 cannot be inadvertently turned on. There could be some incorrect flashing of this light caused by cycling of the output logic circuit of the control system 16 which could give a false indication, when the transistor 173 was off. Accordingly when transistor 173 is turned off to unground resistor 172, a signal is fed from resistor 172 over resistor 174 and diode 175 to switch on transistor 166. This transistor effectively grounds the base of transistor 157 to remove the drive and insure that LED 156 cannot be energized during the time when resistor 172 is ungrounded. Diode 175 in series with the base of transistor 166 increases the voltage drop required to turn transistor 166 on. This insures that when transistor 173 is really on, there is no erroneous signal to gate on transistor 166.

Considering now the solenoid low voltage test circuit 71 in the lower portion of FIG. 4, this circuit includes a conventional multivibrator circuit which is connected between the voltage input conductor 53 and ground. The multivibrator or switching circuit includes NPN type transistors 185, 186, capacitors 187, 188 and resistors 190-193 all intercoupled in a conventional multivibrator circuit. The switching or simulated deceleration signal received from function generator 60 over line 80 is passed over resistor 195, conductor 82, and diode 194 to the collector of transistor 185, to one end of resistor 196, and to one end of resistor 197. A first NPN type transistor 198 has its emitter grounded, its base coupled to resistor 196, and its collector coupled through light-emitting diode 200 and resistor 201 to energizing conductor 53. The collector of transistor 198 is also coupled through a circuit-completing diode 202 to another test point T. The other resistor 197 is coupled to the base of another NPN type transistor 203, which has its emitter grounded and its collector coupled over conductor 70 to the cathode of each of diodes 204, 206 and 208. When transistor 203 is switched on, a disabling circuit is completed through the diodes 204, 206 and 208 to be explained subsequently. This circuit is represented generally by the single line 70 in FIg. 2.

In the operation of the multivibrator circuit in low voltage test circuit 71, when the left side transistor 185 is off, the positive potential applied from conductor 53 is passed over resistor 190 to one end of each of resistors 196 and 197, gating transistors 198 and 203 on. In its conduction transistor 198 completes an energization path for LED 200, which is illuminated to indicate that the solenoid low voltage test is being run. At the same time the other transistor 203 conducts and, over conductor 70 and the diodes 204, 206 and 208, effectively disables the wheel select gate circuit 55 so that the logic circuit in control system 16 will not be cycled by the analyzer during the low voltage solenoid test. Otherwise the simulated deceleration signal supplied to the left and right sensor connections could in fact cycle the logic circuit to provide a "dump" or solenoid actuating signal, and it would be ambiguous as to whether the low voltage test was effecting the dump, or if it was being called for by operation of the logic within the control system 16. Thus with the LED 200 illuminated, the wheel select gate circuit disabled over line 70 and the diodes mentioned, the simulated deceleration signal received over line 80 is passed over resistor 195, conductor 81, and diode 168 (in solenoid resistance test circuit 48), to switch transistor 153 on and off as the deceleration signal is received. Transistor 170 is connected as a series regulator to the positive voltage line, or conductor 47. Thus the positive voltage is the zero reference level, and a negative voltage is applied to the bottom half of the solenoid. The switching on and off of transistor 153 a alternately removes and replaces the drive to the regulator Zener diode 151, which in a preferred embodiment was set to be a 7.7 volt regulator. Because the logic in the control system 16 not operating at this time, the solenoid will not be cycled without providing a ground return, which must be provided through transistor 170. Accordingly a regulated voltage of about 6 to 7 volts is applied to the solenoid winding each time the deceleration signal is received over transistor 153 to turn on the regulator 170. In this way the suitable operation of the solenoid under low voltage conditions, sometimes encountered with a series of trailers connected together, is accurately determined.

It is noted that as the multivibrator in circuit 71 flips over to the other condition, where transistor 185 is on and transistor 186 is off, the drive from deceleration function generator 60 over conductor 80 is effectively grounded through diode 194 and the now-conducting transistor 185. Thus the ground is removed from conductor 70 and the logic circuit is returned to normal. Accordingly it is only when the transistor 185 is off that the low voltage solenoid test is run.

Figure 5:
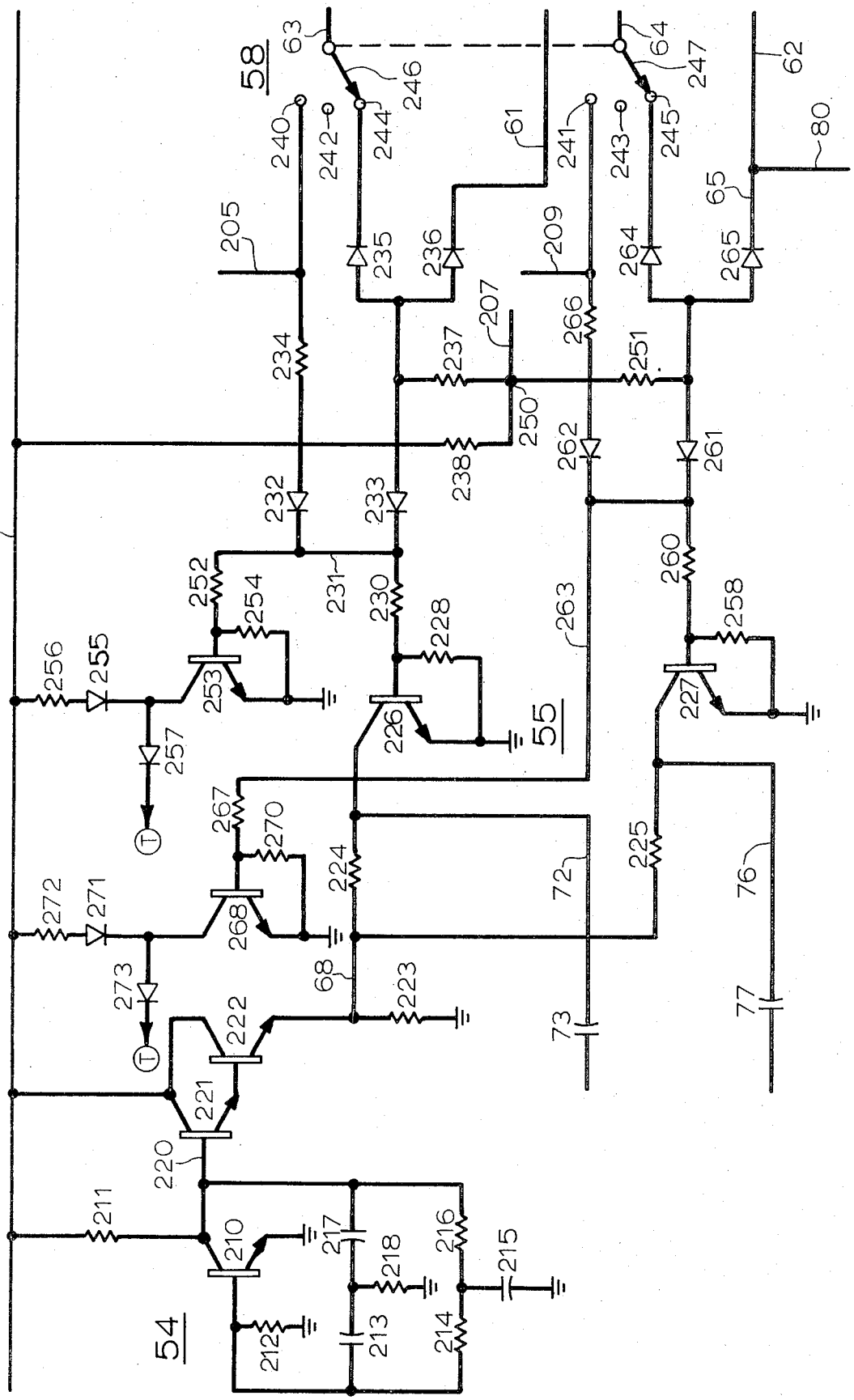

Wheel velocity signal generator 54 is shown in the left portion of FIG. 5. This signal generator includes an NPN type transistor 210, having its emitter grounded and its collector coupled through resistor 211 to conductor 51. The base of transistor 210 is coupled to one end of a resistor 212, the other end of which is grounded; to one side of capacitor 213; and to one side of a resistor 214, the other side of which is coupled both to capacitor 215 and to resistor 216. The other plate of capacitor 215 is grounded, and the other end of resistor 216 is coupled to one side of capacitor 217 and to the collector of transistor 210. Resistor 218 has one end grounded and the other end coupled to one plate of each of capacitors 213 and 217. The components 210–218 are connected in a twin-T oscillator configuration to provide a sine-wave output signal on conductor 220. In a preferred embodiment this oscillator was connected to provide an output signal of approximately 1,000 hertz. The signal on line 220 is applied to NPN transistors 221, 222 connected in a Darlington configuration to develop an output signal over resistor 223 which is passed over conductor 68 to the wheel select gate circuit 55. In that the twin-T oscillator circuit is sensitive to loading, the Darlington stage 221, 222 isolates the load from the oscillator and provides continuous and an accurate output operation of the twin-T oscillator in stage 54.

The thousand hertz signal on line 68 is coupled over a resistor 224, conductor 72, capacitor 73 and conductors 74, 42 to the left sensor input connection of the control system 16. Similarly the signal on line 68 is also applied over resistor 225, conductor 76, capacitor 77, and conductors 78, 43 to the right sensor input connection of the control system 16. Were it not for the presence and functioning of the other circuitry in the wheel select circuit 55, these two signals (over resistors 224, 225) would be continually applied over the sensor input connections of the analyzer to the appropriate connections in the control system to cycle the logic circuits of the control system. The signal on line 68 is a very low power signal and does not affect the voltage divider arrangement at the input portion of the sensor resistance test circuit 75 already described. Those skilled in the art will appreciate that if either signal, that applied over line 72 and capacitor 73, or the other signal on line 76 and capacitor 77, were momentarily grounded or run to zero in a step-function manner, this would simulate a deceleration signal to the logic circuitry within the control system. It remains to explain the operation of the other circuits to provide this modification of the continuous sine-wave signal to simulate the deceleration signal.

Wheel select gate circuit 55 includes a pair of NPN type transistors 226, 227 each connected as a switch to effect the grounding of one of the thousand hertz signals passed over resistors 224, 225, to simulate a deceleration signal to the control system. The emitter of transistor 226 is grounded and its collector is coupled both to resistor 224 and to conductor 72. A resistor 228 is coupled between its base and emitter to assist in shut-off of the circuit. The base is also coupled through a resistor 230 to conductor 231. Diodes 232, 233 have their cathodes coupled to conductor 231. The anode of diode 232 coupled through resistor 234 to conductor 205 and to fixed contact 240 of logic switch 58. This logic switch includes a pair of movable contacts 246, 247 shown engaging fixed contacts 244, 245. This is the "select-low" position of the logic switch 58, in which the analyzer is effective to check out a control system with select-low logic. In the mid position of switch 58, where the movable contacts 246, 247 engage fixed contacts 242, 243, the analyzer of this invention is connected to test a "wheel-by-wheel" logic control system. In this upper position, where the movable contacts 246, 247 engage fixed contacts 240, 241, the analyzer of this invention effectively tests a "select-high" logic control system.

The anode of diode 233 is coupled to the anode of both diodes 235 and 236, and is also coupled through a resistor 237 to a common terminal 250 and conductor 207, over which a logic signal is received from the solenoid low voltage test circuit 71 (FIG. 4). D-C energy to operate the circuits is passed from conductor 51 over resistor 238 to the common terminal 250, which is also coupled to conductor 207, resistor 237 and resistor 251.

Conductor 231 is coupled over a resistor 252 to the base of an NPN type transistor 253, the emitter of which is grounded. A resistor 254 is coupled between the base and emitter of this transistor. The collector of transistor 253 is coupled through a series circuit including a light-emitting diode 255 and a resistor 256 to conductor 51. LED 255 will be illuminated when a deceleration signal (simulated when transistor 266 is gated on) is passed to the left sensor input connection. A circuit-completing diode 257 is coupled between the test point T and the common connection of the collector of transistor 253 and the cathode of diode 255 to complete a circuit through the LED 255 when the test point is grounded, checking operation of LED 255.

In the circuit of transistor 227, a resistor 258 is coupled between its base and emitter, and its emitter is grounded. The base is also coupled over a resistor 260 to conductor 263 and to the common connection of diodes 261 and 262. The anode of diode 261 is coupled to one end of resistor 251, and to the anodes of both of diodes 264, 265. The cathode of diode 264 is coupled to fixed contact 245 of the logic switch, and the cathode of diode 265 is coupled over conductor 65 to conductors 62 and 80. The anode of diode 262 is coupled over a resistor 266 to conductor 209 and to fixed contact 241 of the logic switch 58. Conductor 209 receives a logic signal from the solenoid low voltage test circuit 71 (FIG. 4). The conductor 263 is coupled over a resistor 267 to the base of an NPN type transistor 268, the emitter of which is grounded. A resistor 270 is coupled between the base and the emitter of this transistor. Its collector is coupled over a series circuit including an LED 271 and another resistor 272 to conductor 51. A circuit-completing diode 273 is coupled between a test point T and the common connection between the collector of transistor 268 and the cathode of diode 271. This circuit, upon grounding of test point T, provides a test of the operability of the LED 271. Illumination of this LED 271, other than in the test procedure, indicates that the deceleration signal is being supplied to the right sensor input connection, effected by the conduction of transistor 227 to ground the signal which would otherwise be supplied over capacitor 77. Before considering the operation of this circuit in detail, it is helpful to review the wheel-select switching circuit 56 and the deceleration function generator 60 set out in FIG. 6.

As there shown, each of these circuits is a conventional multivibrator arrangement. The wheel select switching circuit 56 includes a pair of NPN type transistors 275, 276, resistors 277–280, and capacitors 281, 282, intercoupled in a conventional astable multivibrator circuit. Another pair of NPN type transistors 283, 284 are connected as isolation stages between the multivibrator output connections and conductors 63, 64. The collector of transistor 275 is coupled over a resistor 285 to the base of transistor 283, the emitter of which is grounded. The collector of isolation stage 283 is coupled to the conductor 63, and is also coupled over a resistor 286 and conductor 57 to energizing conductor 51. The other isolation stage 284 has its emitter grounded, its base coupled over a resistor 287 to the collector of stage 276, and its collector coupled both through a resistor 288 to conductor 51 and, over conductor 64, to movable contact 247 of the logic switch.

The deceleration function generator 60 includes another multivibrator circuit comprising a pair of NPN type transistors 290, 291. This stage also comprises resistors 292–295 and a pair of capacitors 296, 297, all connected in a conventional astable multivibrator configuration. In a preferred embodiment the time of cycling of the multivibrator 60 was made about 1 second, and the wheel select switching stage 56 was made approximately 10 times that long, to provide a wheel select switching frequency an order of magnitude higher than the frequency at which the deceleration signal was provided by generator 60.

In considering operation of the circuits 54, 55, 56 and 60, together with the logic switch 58, it is assumed that the multivibrators in wheel select switching circuit 56 and deceleration function generator 60 are operating and providing output signals on conductors 63, 64 from circuit 56, and on conductors 61, 62 from generator 60. In the illustrated (select-low) position of logic switch 58, the output signals from deceleration function generator 60 are passed over conductor 61 and diode 236 to the anode of diode 233, and over conductors 62, 65 and diode 265 to the anode of diode 261. Again noting that transistors 226, 227 can be selectively turned on to ground the drive to either the left or right sensor input connection, normally turn-on drive for the transistors 226, 227 would be passed from conductor 51 over resistor 238 to the common connection 250, and rom there over resistor 237, diode 233, and resistor 230 to the base of transistor 226, and over resistor 251, diode 261, and resistor 260 to the base of transistor 227. Absent any grounding signal, both transistor 226, 227 would be continuously on to provide constant amplitude thousand hertz signals to the left and right sensor input connections of the logic system.

Assuming that in deceleration function generator 60 transistor 290 is conducting and transistor 291 is non-conducting, conduction of transistor 290 effectively grounds line 61 and this ground signal is passed over conductor 61, and diode 236 to ground the drive signal for transistor 226. This transistor is thus off, allowing the 1,000 hertz signal from line 68 to pass over line 72 and capactior 73 to the left sensor input connection. Transistor 227 remains on, preventing any output signal from passing over line 76 and capacitor 77 to the right sensor input connection on line 43. When transistors 290 and 291 change states in generator 60, the drive signal for transistor 227 will be disabled by the ground signal passed over conductors 62, 65 and diode 265. Thus transistor 227 is turned off, and the right side sensor signal is passed over conductor 76 and capacitor 77 to the right sensor input of the logic in the control system. At this time transistor 226 begins to conduct, effectively grounding the left side sensor input signal to drive the 1,000 hertz signal to ground, simulating a deceleration signal to the left sensor input connection. Thus with only deceleration function generator 60 functioning, deceleration signals are passed to the sensor input connections of control system 16. Each time a drive signal is supplied to transistor 226 to switch it on and ground out the left side signal to simulate a deceleration signal, the same drive signal is passed over conductor 231 and resistor 252 to the base of transistor 253, turning this transistor on and illuminating LED 255. This indicates that the left side logic is being cycled in the control system. In a similar manner the turn-on of transistor 227 is accompanied by a signal over conductor 263 and resistor 267 to switch on transistor 268, lighting up LED 271 to indicate that the right side of the logic system is being tested. If the logic is operating properly, and even if operation of the solenoid valve is not audible, the appropriate electrical output signal will be passed to the input conductors 47, 142 in the left side of FIG. 4 and LED 144 will be illuminated to indicate satisfactory operation of the logic in control system 16.

Thus operation of the deceleration function generator 60 is effected to simulate deceleration signals to each of the left and right sensor input connections of the logic module. For larger systems, for example a multi-axle system for large truck units with a pair of sensors on each axle, it would be desirable to cycle one side of the logic repeatedly for a short period, and then cycle the other side of the logic repeatedly, to be certain which side was being cycled and look for the appropriate output indications from only that side. It would also be desirable to have a single analyzer be effective for various kinds of logic now used in different brake control systems. To this end the wheel select switching circuit 56 and the logic switch 57 have been incorporated in this invention.

Assuming now that the wheel select switching circuit 56 is cycling, at a rate substantially longer that that of the deceleration function generator 60, these switching output signals are being provided on conductors 63, 64. The illustrated position of logic switch 58 is the "select-low" position. To test select-low logic of a control system, it is only necessary to run one side of the logic continually, or at a high level, while intermittently switching the other signal on and off, so that the switching off simulates a rapid deceleration to zero of the velocity signal. This step function type of deceleration simulation can be accomplished by turning on either of stages 226, 227 as already described.

Assuming now that the wheel select switching circuit 56 is in the condition where transistor 275 is non-conducting and transistor 276 conducting, with transistor 275 non-conducting a positive drive signal is passed from conductor 51 over resistors 277 and 285 to the base of transistor 283, rapidly driving this transistor on and grounding the cathode of diode 235 over switch contacts 244, 246, conductor 63 and the collector-emitter path of transistor 283. This in effect robs the drive from transistor 226, which is turned off, allowing the 1,000 hertz signal to pass to the left sensor input connection. Thus during this long time interval that the grounding signal is received at the cathode of diode 235, it is immaterial that the signal received over line 61 at the cathode of the other diode 236 may be cycling on and off. However with transistor 275 in circuit 56 off, transistor 276 is on and transistor 284 is off. Thus during the same time interval a positive signal is applied over conductor 64 and switch contacts 247, 245 to the cathode of diode 264. Accordingly the operation of this diode 264 is not material in the circuit at this time. However deceleration function generator 60 cycles during this time interval, with the signals on its output conductors 61, 62 alternating. Each time the signal on line 62 goes low the cathode of diode 265 is grounded, and the drive is effectively removed from transistor 227, which is turned off. When function generator 60 switches, the signal on line 62 goes high, allowing the normal drive (over resistor 251) to drive transistor 227 on, grounding the signal from resistor 225. This simulates the deceleration signal over line 76 and capacitor 77 to the right sensor input connection of the logic module. Accordingly transistor 226 is being held off, and transistor 227 is being cycled on and off, during this time interval. During the succeeding time interval, when wheel select switching circuit 56 switches to the condition where stage 275 is on and stage 276 is off, transistor 227 will be held off and transistor 226 will be cycled to successively provide deceleration signals to the left sensor input connection of the logic.

In the condition of wheel select switching circuit 56 wherein transistor 275 is non-conducting and transistor 283 is conducting, the ground signal applied over conductor 63, switch contacts 246, 244 and diode 235 provides an effective ground at the junction of diode 233 and resistor 237. This robs the drive from transistor 226, effectively leaving this transistor off and allowing a continuous 1,000 hertz signal to be applied from line 68 over resistor 224, conductor 72 and capacitor 73 to the left sensor input connection of the control system. Because this signal is continually on, whereas the cycling of deceleration function generator 60 provides alternate high and low signals (over lines 62, 65, diodes 265, 261 and resistor 260) to alternatively turn transistor 227 on and off, the cycling of transistor 227 effectively switches the signal on line 76 and capacitor 77 to the right sensor input on and off, making this appear as the low wheel signal to the control system. After wheel select switching circuit 56 changes state, isolation stage 284 is conducting and isolation stage 283 is non-conducting, and the ground signal is applied over line 64, switch contacts 247, 245, and diode 264 to the junction of diode 261 and resistor 251. This effectively robs the drive from the right side circuit including transistor 277, which will remain on and make the right side appear the high side. At this time the output signal from deceleration function generator 60 which is applied over conductor 61 will cycle the left side logic circuits by alternately rendering transistor 226 conductive and non-conductive. This provides the "select-low" type of output signals to the control system under test by the analyzer. It is important to note that these tests of the logic circuits within control system 16 can be run concomitantly with the effective resistance measurements in the d-c circuits, including sensor resistance test circuit 75 and the solenoid resistance test circuit 48. This simultaneous operation of the circuits significantly reduces the time required to check out a complete control system.

Figure 6:
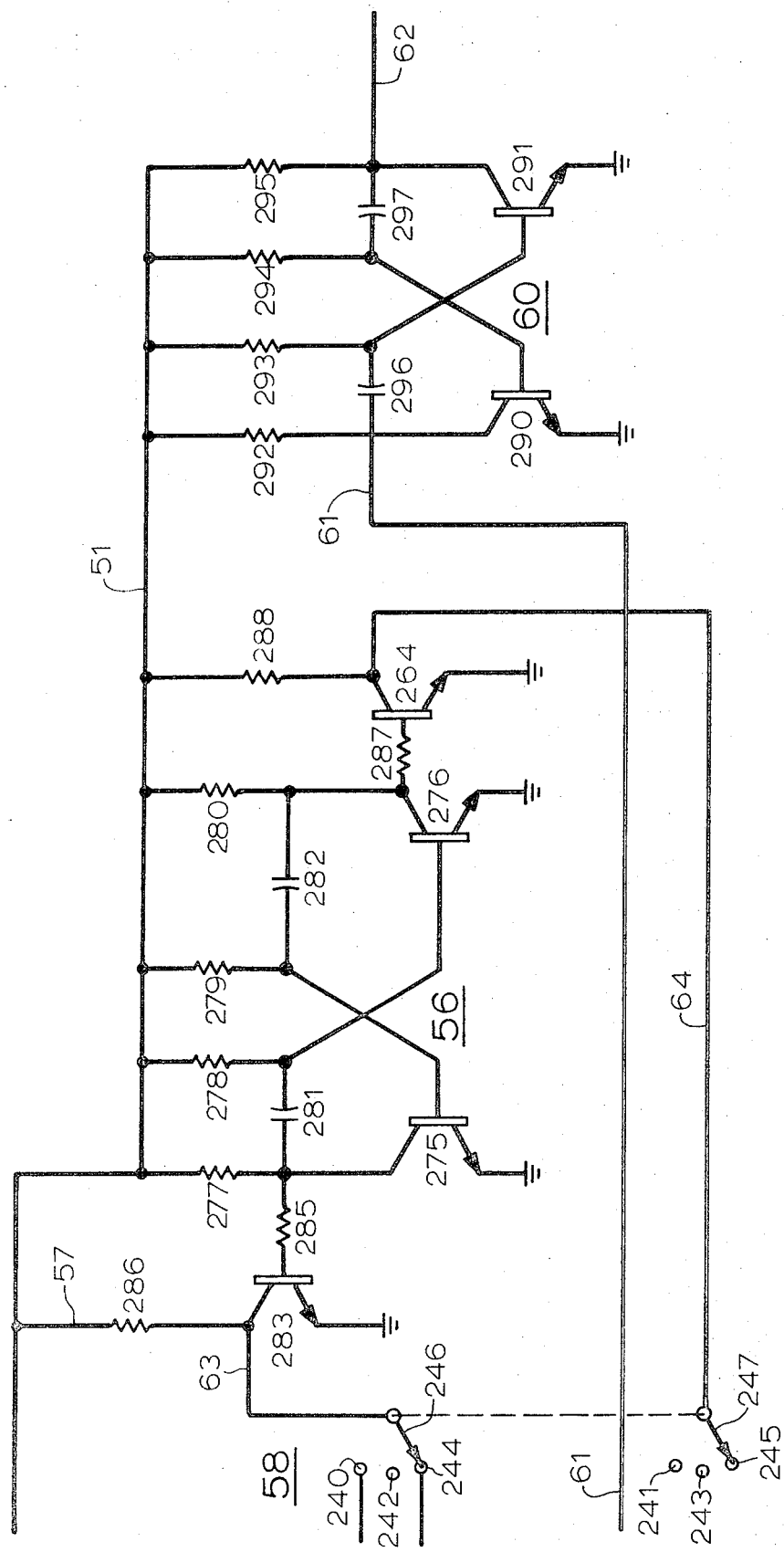

To test a control system in which the logic is connected in a "select-high" arrangement, in which the signal indicating the velocity of the higher speed wheel is utilized, logic switch 58 is displaced from the indicated position in FIGS. 5 and 6 to the position in which movable contacts 246, 247 engage fixed contacts 240, 241. In this position of the logic switch diodes 235, 264 are not effective in the wheel select circuit arrangement. The deceleration function generator 60 operates as before to provide the switching signals over lines 61, 62 to diodes 236, 265. However in this position of the logic switch there is a different source of drive available to turn the transistors 226, 227 on. Assuming that wheel select switching circuit 56 is in condition with output transistor 275 on an isolation stage 283 off, a drive signal is supplied from conductor 51 over conductor 57, resistor 286, conductor 63, switch contacts 246, 240, resistor 234, diode 232, and resistor 230 to the base of transistor 226. Thus transistor 226 will be on so long as the wheel select switching circuit 56 remains in the mentioned condition, with isolation stage 283 off. With stage 226 conducting, the signal to the left sensor input connection is continually disabled. The left sensor signal will then be the low signal, in that it is zero continuously, while the right side sensor input signal is varied. When the long time constant circuit in switching stage 56 changes over, so that isolation stage 283 becomes conductive and stage 284 becomes non-conductive, the drive signal is supplied from line 51 over resistor 288, conductor 64, switch contacts 247, 241, resistor 266, diode 262, and resistor 260 to the base of transistor 227, holding this transistor on and grounding the right side sensor input signal. Under these conditions the right side signal will be the low signal, while the left side sensor signal will be continually cycled on and off as the deceleration function generator 60 operates.

In its operation the deceleration signal supplied from either capacitor 73 or 77 is effective, through the logic circuitry in the control system under test, to provide an actuating signal to the solenoid. To obviate confusion during the solenoid low voltage test which is accomplished with circuit 71 described above in connection with FIG. 4, transistor 203 in the solenoid low voltage test circuit 71 is turned on to provide a ground signal on conductor 70 which is passed, through diodes 204, 206 and 208, over conductors 205, 207 and 209 to the indicated circuit positions in FIG. 5. The ground on conductor 207 effectively deprives the circuits of any drive over diodes 235, 236, 264 and 265. The ground on conductor 205 means that transistor 226 cannot be gated on by a signal received over resistor 234, and similarly the ground on conductor 209 prevents a gating signal from passing over the circuit including resistor 266 to the base of transistor 227. Under these conditions the logic circuits within the control system will not be cycled because there is no switching on and off of either of transistors 226, 227 in the wheel select gate circuit 55. This gate circuit is in effect disabled while the low voltage solenoid test is being run. This test is indicated by the illumination of LED 200 as transistor 198 is gated on at the same time that transistor 203 is driven on to provide the ground or hold-off signals over conductors 205, 207 and 209.

To test a wheel-by-wheel system in which there is no logic to select either the higher or lower level signal of two or more wheel velocity indicating signals, logic switch 58 is displaced so that the movable contacts 246, 247 engage the blank contacts 242, 243. In this condition of the circuit, the output signals from wheel select switching circuit 56 passed over conductors 63, 64 are not utilized in the wheel select gate circuit. However the signals from deceleration function generator 16 are still applied over conductor 61 and diode 236, diode 233, and over conductor 62 and diode 265, to cycle the switching transistors 226, 227 in the wheel select gate circuit. Thus the left and right sensor input connections receive deceleration signals as the function generator 60 cycles without any modification of the system operation by the wheel select switching circuit 56. This enhances the versatility of the analyzer in that it enables the various types of logic arrangements utilized in different connections of various control systems to be tested with a single analyzer unit.

While only a particular embodiment of the invention has been described and illustrated, it is apparent that various modifications and alterations may be made therein. It is therefore the intention in the appended claims to cover all such modifications and alterations as may fall within the true spirit and scope of the invention.

What is claimed is:

1. An anlyzer for use with a regulated braking arrangement having a control system including a power line, at least one sensor input for receiving a signal related to wheel velocity, and a pressure relief signal output connection for coupling to a solenoid winding to provide a signal which reduces braking pressure and obviates wheel lock-up, which analyzer comprises:
    a sensor resistance test circuit, having an input connection for coupling to the sensor input in the control system, operative to determine whether the sensor resistance value is between predetermined upper limit and lower limit values, including a reference resistor connected to complete a voltage divider with the sensor under test, an indicator circuit, including a first transistor series-coupled with an indicator component, means including a second transistor for turning on the first transistor when the effective resistance of the sensor under test is below the predetermined upper limit value, and means including a third transistor for turning off the first transistor when the effective resistance of the sensor under test is below the predetermined lower limit value; and
    a power supply stage, connected to receive power from the control system and to energize the sensor resistance test circuit.

2. An analyzer as claimed in claim 1, in which said sensor resistance test circuit further includes a first potentiometer for adjusting the predetermined upper limit resistance value of the sensor under test, and a second potentiometer for adjusting the predetermined lower limit resistance value of the sensor under test.

3. An analyzer as claimed in claim 1, and further comprising a solenoid resistance test circuit, having an input connection for coupling to the pressure relief signal output connection in the control system, operable to determine whether the solenoid resistance value is between predetermined upper limit and lower limit values.

4. An analyzer as claimed in claim 3, and further comprising a solenoid low voltage test circuit, connected to be energized from said power supply stage, and coupled to said solenoid resistance test circuit, to provide an indication of solenoid operability under low voltage conditions.

5. An analyzer for use with a regulated braking arrangement having a control system including a power line, first and second sensor inputs for receiving first and second signals related to first and second wheel velocities, and a pressure relief signal output connection for coupling to a solenoid winding to provide a signal which reduces braking pressure and obviates wheel lock-up, which analyzer comprises:
    a first sensor resistance test circuit, having a first input connection for coupling to the first sensor input in the control system, operative to determine whether the first sensor resistance value is between predetermined upper limit and lower limit values;
    a power supply stage, connected to receive power from the control system and to energize the sensor resistance test circuit;
    a second sensor resistance test circuit, having a second input connection for coupling to the second sensor input in the control system, operative to determine whether the second sensor resistance value is between the predetermined upper limit and lower limit values;
    a wheel select gate circuit, having a first input connection for receiving a wheel velocity signal, second and third input connections for receiving a deceleration signal, and a pair of output connections respectively coupled to the input connections of the sensor resistance test circuits for passing deceleration signals to the sensor inputs of the control system under test;
    a wheel velocity signal generator, connected for energization from the power supply to pass a wheel velocity signal to the first input connection of the wheel select gate circuit; and
    a deceleration function generator, connected to be energized from the power supply, and to pass output signals to the second and third input connections of the wheel select gate circuit, for application through said gate circuit output connections to the control system sensor inputs, to simulate a deceleration signal to the logic circuits within the control system being analyzed.

6. An analyzer for use in a multi-wheel vehicle having a braking arrangement regulated by a control system which includes a power line, at least one sensor input connection for receiving an electrical signal related to the velocity of a first wheel, and a pressure relief signal output connection for coupling to a solenoid winding to reduce braking pressure in the vehicle and prevent wheel lock-up, which analyzer comprises:

a sensor resistance test circuit, having an input connection for coupling to the control system sensor input connection, including a reference resistor coupled to the sensor input connection for completing a voltage divider with the sensor under test, an indicator circuit, including an indicator component series-coupled with a first transistor between an energizing conductor and ground, to energize the indicator component when the transistor is turned on, means including a second transistor connected to receive an upper limit bias signal at one of its connections and to receive a sensor resistance signal at another of its connections to provide a signal for turning on the first transistor when the sensor resistance is less than the upper limit value, and means including a third transistor connected to receive a lower limit bias signal at one of its connections and to receive the sensor resistance signal at another of its connections, such that the third transistor remains non-conductive when the sensor resistance value is above the lower limit value, and such that the third transistor conducts to provide a signal for turning off the first transistor when the sensor resistance value is below the lower limit value; and a power supply stage, coupled between the power line and the energizing conductor, to energize the analyzer.

7. An analyzer as claimed in claim 6, in which said sensor resistance test circuit further includes a first potentiometer for adjusting the value of the upper limit bias signal, and a second potentiometer for adjusting the value of the lower limit bias signal.

8. An analyzer as claimed in claim 6, and further comprising a solenoid resistance test circuit, having an input connection for coupling to the pressure relief signal output connection in the control system, operable to determine whether the solenoid resistance value is between predetermined upper limit and lower limit values.

9. An analyzer as claimed in claim 8, and further comprising a solenoid low voltage test circuit, connected to be energized from said power supply stage, and coupled to said solenoid resistance test circuit, to provide an indication of solenoid operability under low voltage conditions.

10. An analyzer as claimed in claim 6, and further comprising a deceleration function generator, operable to provide a simulated deceleration signal with a negative-going slope of the type which would actuate the control system under test to provide a brake pressure reduction signal, circuit means for applying said simulated deceleration signal over the input connection of the sensor resistance test circuit to the control system under test, and indicator means, coupled to the control system pressure relief signal output connection, for providing an indication that the control system is producing a pressure relief signal upon receipt of the simulated deceleration signal.

11. An analyzer as claimed in claim 6, and further comprising a power test circuit, coupled between the power line and the power supply stage, to provide an indication when the level of the voltage or the power line exceeds a preset value.

12. An analyzer for use in a multi-wheel vehicle having a braking arrangement regulated by a control system which includes a power line, first and second sensor input connections for receiving first and second electrical signals related to the velocities of first and second wheels, and a pressure relief signal output connection for coupling to a solenoid winding to reduce braking pressure in the vehicle and prevent wheel lock-up which analyzer comprises:

a sensor resistance test circuit, having an input connection for coupling to the control system sensor input connection, for coupling to the control system sensor input connection, including a reference resistor coupled to the sensor input connection for completing a voltage divider with the sensor under test, an indicator circuit, including an indicator component series-coupled with a first transistor between an energizing conductor and ground, to energize the indicator component when the transistor is turned on, means including a second transistor connected to receive an upper limit bias signal at one of its connections and to receive a sensor resistance signal at another of its connections to provide a signal for turning on the first transistor when the sensor resistance is less than the upper limit value, and means including a third transistor connected to receive a lower limit bias signal at one of its connections and to receive the sensor resistance signal at another of its connections, such that the third transistor remains non-conductive when the sensor resistance value is above the lower limit value, and such that the third transistor conducts to provide a signal for turning off the first transistor when the sensor resistance value is below the lower limit value;

a power supply stage, coupled between the power line and the energizing conductor, to energize the analyzer;

a second sensor resistance test circuit, having a second input connection for coupling to the second sensor input connection in the control system, operative to determine whether the second sensor resistance value is between the predetermined upper limit and lower limit values;

a wheel select gate circuit, having a first input connection for receiving a wheel velocity signal, second and third input connections for receiving a deceleration signal, and a pair of output connections respectively coupled to the input connections of the sensor resistance test circuits for passing deceleration signals to the sensor inputs of the control system under test;

a wheel velocity signal generator, connected for energization from the power supply to pass a wheel velocity signal to the first input connection of the wheel select gate circuit; and a deceleration function generator, connected to be energized from the power supply, and to pass output signals to the second and third input connections of the wheel select gate circuit, for application through said gate circuit output connections to the control system sensor input connections, to simulate a deceleration signal to the logic circuits within the control system being analyzed.

13. An analyzer as claimed in claim 12, and further comprising a wheel select switching circuit, for providing a signal alternating at a frequency substantially lower than the switching frequency of the deceleration function generator, and a logic switch, coupled between the wheel select switching circuit and additional input connections of the wheel select gate circuit, operable to provide appropriate switching of the signals provided from the wheel select gate circuit output connections to test select-low logic control systems, select-high logic control systems, and wheel-by-wheel logic control systems.

* * * * *